United States Patent
Lombardi et al.

[11] Patent Number: 5,942,566
[45] Date of Patent: Aug. 24, 1999

[54] CERAMIC FEEDSTOCK COMPOSITION FOR THE MANUFACTURE OF PROTOTYPE ELEMENTS

[75] Inventors: John L. Lombardi; Gregory E. Hilmas; Dragan Popovich, all of Tucson, Ariz.

[73] Assignee: Advanced Ceramics Research, Inc., Tuscon, Ariz.

[21] Appl. No.: 08/887,710

[22] Filed: Jul. 3, 1997

[51] Int. Cl.⁶ .................................................. C08K 5/10
[52] U.S. Cl. .................... 524/318; 524/413; 524/430; 524/443
[58] Field of Search ................................. 524/318, 413, 524/430, 443

[56] References Cited

U.S. PATENT DOCUMENTS

| | | | |
|---|---|---|---|
| 4,280,939 | 7/1981 | Johnson | 524/271 |
| 4,472,537 | 9/1984 | Johnson | 524/272 |
| 5,019,537 | 5/1991 | Kato | 524/560 |
| 5,121,329 | 6/1992 | Crump . | |
| 5,278,251 | 1/1994 | Ohtani et al. . | |
| 5,280,086 | 1/1994 | Kawamoto | 524/430 |
| 5,340,433 | 8/1994 | Crump . | |
| 5,432,224 | 7/1995 | Ryuhgoh | 524/430 |
| 5,531,819 | 7/1996 | Sawada | 524/298 |
| 5,591,787 | 1/1997 | Schlennert | 524/276 |

FOREIGN PATENT DOCUMENTS

| | | |
|---|---|---|
| 0511428B1 | 4/1992 | European Pat. Off. . |
| 3630690A1 | 12/1987 | Germany . |

*Primary Examiner*—Paul R. Michl
*Attorney, Agent, or Firm*—Banner & Witcoff, Ltd.

[57] ABSTRACT

A ceramic or metal feedstock composition useful for manufacture of prototype elements using a filament or ribbon deposition apparatus, includes a ceramic or metal powder, a binder of ethylene/acrylate copolymer or homopolymer, a wax and liquid plasticizer mixed together in the form of a ribbon or rod which may then be used in a prototyping device.

2 Claims, No Drawings

CERAMIC FEEDSTOCK COMPOSITION FOR THE MANUFACTURE OF PROTOTYPE ELEMENTS

BACKGROUND OF THE INVENTION

This invention relates to a material or composition which is useful in the manufacture of prototype elements, and more particularly, to a ceramic feedstock composition which may be used in a ribbon or filament deposition apparatus for the manufacture or building of prototype elements.

In U.S. Pat. No. 5,340,433 and U.S. Pat. No. 5,121,329, there is depicted a device or apparatus which is useful for the manufacture of prototype elements. The device feeds a filament of filled or unfilled polymer or other material through a discharge nozzle for deposition upon a platen. Either the nozzle or platen or both move in accord with a pre-programed pathway to enable the filament of material discharged from the nozzle of the device to form a prototype element. For example, gear shapes may be formed in this manner, though the particular shape formed is not a limiting feature of the invention. The subject matter of U.S. Pat. No. 5,340,433 and U.S. Pat. No. 5,121,329 is incorporated herewith by reference.

Various compositions and materials have been used or are disclosed for use in a process of the type depicted in the aforesaid U.S. Patents. Further, applicants herein are co-inventors with respect to advanced type apparatus useful in the creation of prototype elements using a filament deposition technique.

One of the challenges with respect to such methods and procedures is to devise a ceramic or other feedstock composition which will be especially useful in the creation of prototype elements and low volume production parts. Such a feedstock material should have adequate hardenability and toughness when formed into a desired element. The feedstock material should also be capable of use in apparatus of the type described. Such materials should also be subject to binder removal and sintering so that the element created utilizing the process may acquire both high strength and sintered density (95% of theoretical) enabling it to be used in a test or low volume ceramic parts production environment. Thus there has remained a need to provide an improved feedstock composition useful for the manufacture of prototype elements using ribbon deposition type apparatus and techniques.

SUMMARY OF THE INVENTION

Briefly, the present invention comprises a ceramic or metal feedstock composition for the manufacture of prototype elements using a filament or ribbon deposition apparatus wherein the composition comprises the combination of the four primary materials including:

(a) a ceramic or metal powder or powder mix;
(b) an ethylenejacrylate based copolymer binder (i.e. polyethylene-co-ethyl acrylate, polyethylene-co-butyl acrylate);
(c) wax (i.e. microcrystalline polyethylene wax, paraffin wax, beeswax, carnauba wax, amide wax, or combinations thereof); and
(d) liquid plasticizer.

These materials are mixed together and upon appropriate compounding, may be used in a prototype machine having a discharge nozzle which discharges a molten filament or ribbon in a pattern to form prototype elements. A wide variety of Group II, III, and IV and transition metal carbide, nitride, and oxide ceramic powders are useable in the invention as well as ferrous and nonferrous alloy powders. The ceramic or metal powder is typically ball milled either dry or in a solvent vehicle to disperse, deagglomerate, and uniformly mix the ceramic powders. Hexane is a preferred liquid vehicle for ball milling, but other liquids may be used. The hexane is then stripped from the material, e.g., by distillation, so that the ceramic powder remains. The powder is then mixed in combination with the other materials cited above. The combined materials have preferred ranges or amounts. The ceramic or metal powder, for example, comprises in the range of 75 to 93 weight % of the composition. The binder comprises 4.5 to 14 weight percent of the composition. The wax comprises 1.5 to 6 weight percent of the composition and the plasticizer comprises 1 to 5 weight percent of the composition. Typically, the green feedstock composition is fed into a prototype machine wherein a nozzle discharges a filament or ribbon in a specific pattern as described above. The prototype element is then debindered and sintered. In this manner a prototype element is created. It should also be noted that the feedstock may be utilized to manufacture a molded prototype product which is formed, fired and/or sintered.

Thus it is an object of the invention to provide an improved feedstock composition useful for the manufacture of prototype elements.

It is a further object of the invention to provide a ceramic feedstock composition which has minimal shrinkage and cracking densification of the debindered prototype element.

Yet another object of the invention is to provide a green ceramic feedstock composition which may be utilized to manufacture prototype elements wherein the elements are uniform in appearance and structure even following sintering thereof.

Another object of the invention is to provide a green ceramic feedstock composition which may be used to manufacture prototype elements wherein the fired elements have a density greater than 95% and possess high strength.

These and other objects, advantages and features of the invention will be set forth in the detailed description which follows.

DESCRIPTION OF THE PREFERRED EMBODIMENT

The ceramic feedstock of the invention may be utilized in prototype machines of the type described in U.S. Pat. No. 5,340,433 and U.S. Pat. No. 5,121,329 and pending U.S. application Ser. No. 08/825,893 filed Apr. 2, 1997, entitled, "Method and Apparatus for In-Situ Formation of Three-Dimensional Solid Objects By Extrusion of Polymeric Materials." Other element forming machines may also be utilized in the practice of the invention. That is, the ceramic feedstock material may be used for feeding into a machine of the general nature described to thereby create a three-dimensional object from such feedstock.

The feedstock is comprised of four basic components: (1) ceramic or metal powders; (2) polyethylene-co-acrylate copolymer binder; (3) wax; and (4) liquid plasticizer. These four materials may be utilized with certain additional additives. For example, additives such as coloring agents may be utilized.

Advantageously, the powders which may be used to provide a feedstock include ceramic oxides, ceramic carbides, ceramic nitrides, ceramic borides, suicides, and metals or mixtures thereof. Preferred powders for use in that composition include aluminum oxide, barium oxide, barium titanate, beryllium, oxide, calcium oxide, cobalt oxide, chromium, oxide, dysprosium oxide and other rare oxides, lanthanum oxide, magnesium oxide, manganese oxide, niobium oxide, nickel oxide, aluminum phosphate and other phosphates, lead oxide, lead titanate, lead zirconate, silicon oxide and silicates, thorium oxide, titanium oxide and titanates, uranium oxide, yttrium oxide, yttrium aluminate, zirconium oxide and its alloys, boron carbide, iron carbide, hafnium carbide, molybdenum carbide, silicon carbide, tantalum carbide, titanium carbide, uranium carbide, tungsten carbide, zirconium carbide, aluminum nitride, boron nitride, silicon nitride, titanium nitride, uranium nitride, yttrium nitride, zirconium nitride, aluminum boride, hafnium boride, molybdenum boride, titanium boride, zirconium boride, molybdenum disilicide, as well as nickel, iron, chromium, cobalt, or their alloys, aluminum, beryllium, boron, copper, gold, hafnium, iridium, magnesium, manganese, molybdenum, niobium, palladium, platinum, rhenium, silver, tantalum, titanium, tungsten, zinc and zirconium.

The binder used in the invention is a homopolymer or copolymer of ethylene and acrylic acid or its ester. Examples of useable copolymer binders include polyethylene-co-ethylacrylate, polyethylene-co-butylacrylate and polybutylacrylate where polyethylene-co-ethylacrylate is the preferred polymer binder in this invention.

A wide variety of natural and synthetic waxes may be used in this formulation which impart dimensional rigidity upon cooling to the dispensed molten feedstock filament or ribbon material. These waxes include, but are not limited to, microcrystalline polyethylene wax, beeswax, paraffin wax, carnauba wax, Montan wax, and amide wax where microcrystalline polyethylene is the preferred material in the invention formulation.

A liquid plasticizer is also an ingredient of the invention and serves as a processing aid that reduces the melt viscosity of the feedstock composition, as well as increases the flexibility and toughness of its polymer binder component. These liquid plasticizers may be esters of fatty acids (i.e. butyl oleate), esters of phthalic acid (i.e. dibutyl phthalate, dioctylphthalate), or hydrocarbon oils (i.e. Heavy White Mineral Oil).

In any event, the feedstock formulation can be processed as a rod or as a small diameter (e.g. 0.070" diameter) filament forms. The rod feedstock is readily processed using high pressure extrusion heads of the type described in Application Ser. No. 08/825,893. Filament feedstock can be utilized in apparatus of the type disclosed in U.S. Pat. No. 5,340,433 and U.S. Pat. No. 5,121,329.

The filament feedstock is very flexible and will not fracture after repeated flexure. This phenomenon is observed despite the fact that the filament is greater than 50% by volume ceramic material.

The material is fabricated or mixed and then processed in the apparatus of the type described, for example, to form a turbine blade, rotor blade or gear. The formed components are then heated in an oven to remove their organic phase. Test materials did not crack or warp after such treatment indicating that the binder is uniformly removed from the parts during the heating operation. The parts also have been sintered without any pressure to density the material and observations are that at least 80% of these sintered parts make distortion-free ceramic prototype elements. The density of such sintered materials is greater than 95% of its theoretical density. The sintered part also exhibits high strength.

Following is a specific example of the formulation of the feedstock composition and the protocol or procedure make such a feedstock:

EXAMPLE ONE

A silicon nitride powder is first ball milled in a hexane solvent to disperse, deagglomerate and uniformly mix with other ceramic powders, specifically yttrium oxide and aluminum oxide. Other solvents (e.g. ethanol, isopropanol) may be used. The composition of the mixture is as follows:

49.1 wt. % (H.C. Starck M11) Silicon Nitride 5.12 wt. % Yttrium Oxide (Molycorp Inc.)

1.68 wt. % Aluminum Oxide (Ceralox Corp.)

43.2 wt. % Hexane (A.C.S. Reagent or HPLC Grade)

0.9 wt. % Ethomeen C-12 Dispersant (Akzo Nobel Chemicals, Inc. fatty aminoalcohol)

Subsequent to the mixing of the composition, the hexane is stripped from the mixture by a distillation process. The ceramic powders remain after the stripping operation. The ceramic powders are then batched with the other materials comprising the feedstock composition in a Brabender High Torque mixer to formulate the green ceramic feedstock composition. Following is a summary of the mix in the green feedstock composition:

82.5 wt. % ceramic powder 11.7 wt. % polyethylene-co-ethylacrylate binder (Union Carbide Corp. DPDA 6182)

3.45 wt. % BASF AL3 Microcrystalline Polyethylene Wax 2.35 wt. % Butyl oleate Plasticizer (Witco Corp. Kemester 4000)

Following the mixing of the material and to create the green ceramic feedstock, the materials are fed as a filament into a machine of the type disclosed in U.S. Pat. No. 5,340,433 and U.S. Pat. No. 5,121,329 or U.S. application Ser. No. 08/825,893. The extruded materials thus define a complex shaped prototype element in accord with the teachings herein. The element is then debindered to eliminate the organic phase. Thereafter, the parts are sintered in an inert nitrogen atmosphere. The observed parts were described above.

EXAMPLE TWO

The same formulation procedure was followed as in Example 1 but with different components as set forth below:

80.8 wt. % $Si_3N_4$ (milled in hexane with $Al_2O_3$ and $Y_2O_3$ sintering aids → same ratio as in Ex. 1.)

11.6 wt. % polyethylene-co-ethylacrylate copolymer 2.8 wt. % BASF AL3 Microcrystalline Polyethylene Wax 3.0 wt. % Beeswax (N.F. Refined)

1.8 wt. % Butyl oleate

EXAMPLE THREE

Again, the same formulation procedure as in Example One was followed:

80.7 wt. % $Si_3N_4$ milled powder (w/$Al_2O_3$ and $Y_2O_3$ as in Ex. 1.)

11.6 wt. % polyethylene-co-ethylacrylate copolymer 5.9 wt. % Beeswax (N.F. Refined)

1.8 wt. % Butyl oleate

EXAMPLE FOUR

A pre-mixed stainless steel powder is batched with the other materials comprising the feedstock composition using a Brabender High Torque mixer to formulate the green ceramic feedstock composition. The following is a summary of the mix in the green feedstock composition:

92.69 wt. % ANVAL 17-4 PH Stainless Steel Powder
4.89 wt. % polyethylene-co-ethylacrylate copolymer
1.46 wt. % BASF AL3 Microcrystalline Polyethylene Wax
0.95 wt. % Butyl oleate Plasticizer (WitcoCorp.Kemester 4000)

The materials were, following binder removal and sintering, successfully formed as prototype elements using the described techniques.

Various other formulations and combinations of the particular elements set forth are possible. Thus the invention is to be limited only by the following claims and equivalent thereof

We claim:

1. A method of manufacture of a prototype element comprising the steps of:

a) formulating a feedstock composition comprising:
      i) a powder taken from the group consisting of silicon nitride, aluminum oxide, yttrium oxide and mixtures thereof, said powder comprising at least 50% by volume of the composition;
      ii) an ethylene acrylate copolymer binder;
      iii) wax;
      iv) liquid plasticizer compatible with the binder taken from the group consisting of fatty acid esters, mineral oil and mixtures thereof
   b) extruding a ribbon or filament of said feedstock into a prototype element shape, and
   c) debinding the prototype element shape to excise the organic materials.

2. The method of claim 1 wherein the feedstock is comprised of a powder comprising 75 weight % to 93 weight % of the composition, a binder comprising 4.5 to 14 weight % of the composition, the wax comprises 1.5 to 6 weight % of the composition and the plasticizer comprises 1 to 5 weight % of the composition.

* * * * *